(12) United States Patent
Spector

(10) Patent No.: US 6,356,274 B1
(45) Date of Patent: Mar. 12, 2002

(54) COMPUTER SYSTEM FOR CONVERTING A COLORED PICTURE INTO A COLOR-IN LINE DRAWING

(76) Inventor: Donald Spector, 380 Mountain Rd., Union City, NJ (US) 07080

( * ) Notice: Subject to any disclaimer, the term of this patent is extended or adjusted under 35 U.S.C. 154(b) by 0 days.

(21) Appl. No.: 09/245,122

(22) Filed: Jan. 25, 1999

(51) Int. Cl.[7] ................................................ G06F 3/00
(52) U.S. Cl. ...................... 345/589; 345/593; 345/597; 345/764; 382/165; 382/176
(58) Field of Search ................................. 345/339, 329, 345/337, 336, 431, 442, 432; 382/358, 165, 176, 286, 258

(56) References Cited

U.S. PATENT DOCUMENTS 5,485,288 A * 1/1996 Kamei et al. ............... 382/165
5,809,179 A * 9/1998 Marimont et al. .......... 382/254

* cited by examiner

Primary Examiner—Raymond J. Bayerl
Assistant Examiner—Thomas T. Nguyen

(57) ABSTRACT

A computer system for converting a colored picture composed of color regions distributed throughout the picture into a line drawing in which each of these regions is delineated to define a zone. The zone bears a symbol which identifies the color to be applied thereto. The system includes a computer whose video display terminal is coupled to a printer to print out the displayed image. Fed into the computer is a digital image of the colored picture to be converted, the image being processed to produce the line drawing which is displayed on the terminal and transferred by the printer to a paper sheet. By applying to the respective zones of the line drawing on the sheet the colors identified by the symbols, the user is then able to recreate the colored picture.

6 Claims, 2 Drawing Sheets

COMPUTER SYSTEM FOR CONVERTING A COLORED PICTURE INTO A COLOR-IN LINE DRAWING

BACKGROUND OF THE INVENTION

1. Field of Invention

This invention relates generally to a craft kit provided with a set of crayons or color markers and computer software, and more particularly to a kit of this type in which the software therein makes it possible to set up a computer system adapted to convert a digital image of a colored picture into a line drawing divided into zones, each of which corresponds to a color region of the picture whereby a child using the set can color in the zones to recreate the colored picture.

2. Status of Prior Art

In the Italian Renaissance, it was then common practice for an artist, when undertaking to create a large painting, to first draw with charcoal on the surface to be painted a line drawing, called a cartoon, which outlined or sketched the intended painting. The artist would then paint over the cartoon to create a multi-colored painting.

Since the work of popular artists was then in great demand, a master artist would set up a school whose students served as apprentices who learned their craft by coloring in cartoons drawn by the master artist. It is for this reason that some paintings on display in museums are identified as being from the School of Rubens, or whatever other great artist was responsible for the cartoon underlying the painting.

It is no longer the practice for artists who paint to first draw a cartoon of the picture to be painted. Yet in a way this practice persists in so called paint-by-the-numbers pictures and colored pictures produced by users of craft kits. Such popular kits are provided with a set of crayons or color markers and a book on each of whose pages is printed a color-in line drawing or cartoon of a colored picture. The line drawing is divided into zones, each being delineated to encompass a respective color region of the colored picture.

Thus if the line drawing is that of a clown wearing a hat and a baggy costume, the zones dividing this line drawing make it possible for the child using the set of crayons to apply different colors to the hat, the costume, to the face and shoes of the clown and all other color regions of the figure to thereby recreate the original colored picture from which the line drawing was extracted.

A craft kit of the conventional type teaches a child using the kit the distinctions between colors and how to apply these colors to a drawing. But while this kit makes it possible for a child to recreate a colored picture whose original is the work of an artist, the child has no hand in choosing the colored picture to be reproduced, for it is the manufacturer of the kit who prints the line drawings to be colored-in. And in using the kit, the child gains no appreciation of the artistry involved in creating the original colored picture.

It is common practice for an art student to set up an easel supporting a canvas next to a known masterpiece in a museum, and with a palette then paint the canvas to reproduce the masterpiece. Though the reproduction may be poor, what the student gains by this experience is an appreciation of the artistry underlying the masterpiece. Since the present invention uses a computer to convert a colored picture into a line drawing, of prior art interest is line drawing conversion software, such as computer programs for this purpose produced by Micrografx Picture Publishers.

SUMMARY OF INVENTION

In view of the foregoing, the main object of this invention is to provide a craft kit having a set of crayons or markers of different colors and computer software making it possible to set up a computer system for converting a colored picture composed of color regions distributed throughout the picture into a line drawing in which each color region of the picture is delineated to define a zone to which color can be applied to recreate the colored picture.

More particularly, an object of this invention is to provide a system of the above type in which a digital image of the colored picture to be converted is fed into the system, the colored picture being one selected by the user of the system. By colored picture is meant not only a color photograph, but also a multi-colored painting or other work of art, or a scene viewed by a video camera.

Thus the craft kit may include software in which is digitally stored all of the known paintings of a major artist, such as Cezanne, the user of the system selecting from this software the Cezanne painting to be converted into a line drawing. Or the colored picture may be derived by a video camera trained on a scene.

Also an object of this invention is to provide a computer system for converting a colored picture into a line drawing by processing a digital image of the picture to extract therefrom the color regions distributed throughout the picture to define zones which delineate these regions, each zone bearing a number or symbol to identify the color to be applied thereto by a user of the system.

A significant advantage of the invention in which a line drawing divided into color-in zones is extracted from a multi-color picture, is that when the picture is that of a classic work of art, the child or user who colors in the zones of the line drawing gains an appreciation of the artistry underlying the work of art.

Briefly stated, these objects are attained by a computer system for converting a colored picture composed of color regions distributed throughout the picture into a line drawing in which each of these regions is delineated to define a zone. The zone bears a symbol identifies the color to be applied thereto.

The system includes a computer whose video display terminal is coupled to a printer to print out the displayed image. Fed into the computer is a digital image of the colored picture to be converted, the image being processed to produce said line drawing which is displayed on the terminal and transferred by the printer to a paper sheet. By applying to the respective zones of the line drawing on the sheet the colors identified by the symbols, the user is then able to recreate the colored picture.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
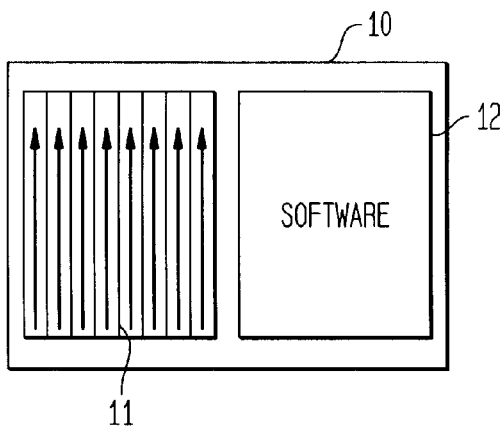
FIG. 1 schematically shows the contents of a craft kit in accordance with the invention.

A craft kit in accordance with the invention includes, as shown in FIG. 1, a box 10 housing a set 11 of crayons or color markers of different color. The set contains ten or more crayons, the number depending on how many colors are included in the colored picture to be converted into a line drawing and how the computer system analyzes these colors.

Also housed in box 10 is the software 12 necessary to set up a computer system capable of converting a colored picture composed of color regions distributed throughout the picture into a line drawing in which each of these regions is delineated to define a zone bearing a symbol or number identifying the color to be applied to the zone by a child using the kit in order to recreate the colored picture.

Figure 2:
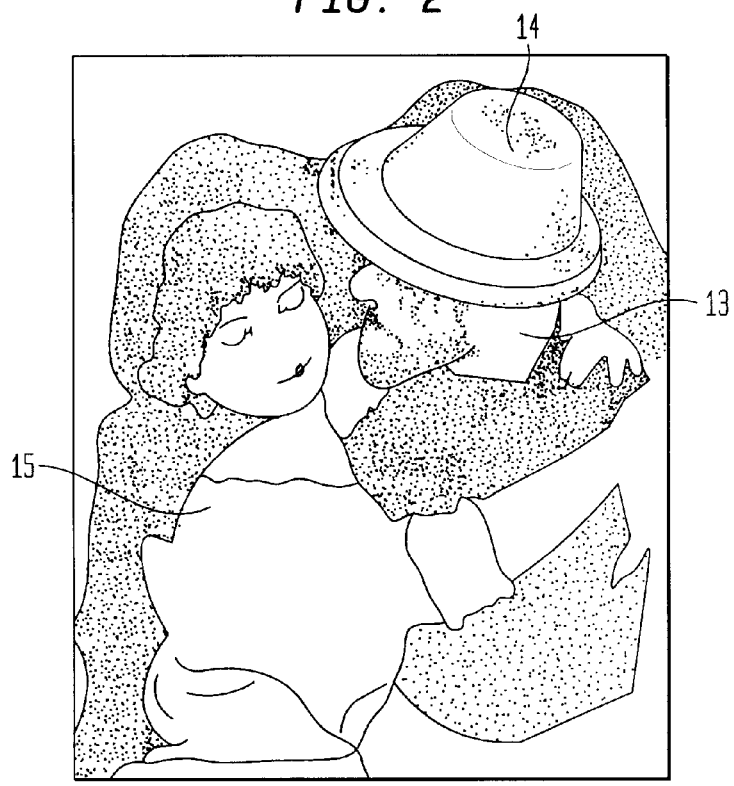
FIG. 2 is an example of a colored picture which is to be converted into a color-in line drawing by means of a computer system in accordance with the invention.

By way of example, the colored picture to be converted by the system into a line drawing is a well-known painting by Renoir as shown in FIG. 2. This painting illustrates a man 13 wearing a hat 14 dancing with a woman 15.

The Renoir picture is painted in several colors, the color regions being distributed throughout the picture. When a digital image of this picture is converted by the computer system into a line drawing, this line drawing, as shown in FIG. 3, is divided into zones Z, each zone corresponding to a color region of the picture and delineating this region.

Figure 3:
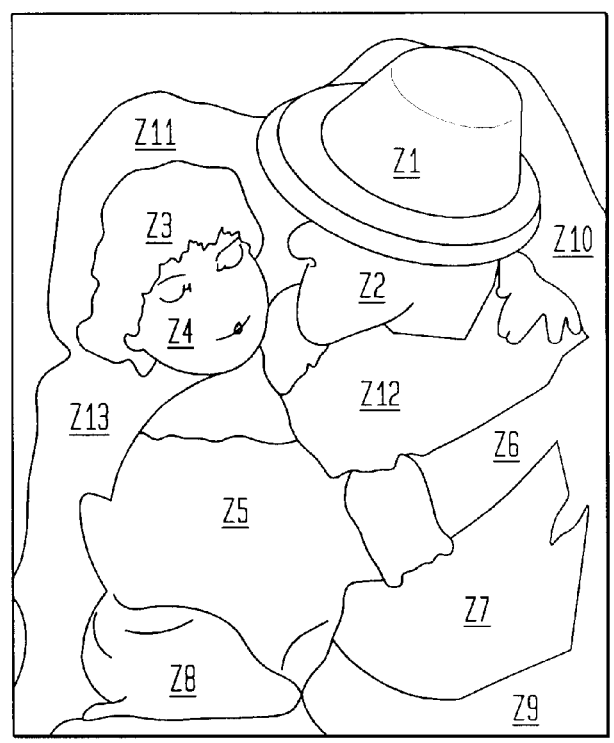
FIG. 3 shows the line drawing extracted from this colored picture.

The line drawing shown in FIG. 3 is divided into zones $Z_1$ to $Z_{13}$, zone $Z_1$ encompassing hat 14 worn by the man, zone $Z_2$ being the face of the of the man and zone $Z_3$ the hair of woman 15, each zone calling for a different color. Hence the user of the system must color in zone $Z_1$ with a color similar to or matching that of the hat color which appears in the original picture. Zone $Z_2$ encompasses the hair on the head of woman 15 and therefore must be colored in with a similar color.

While a different number has been applied to each zone in FIG. 3, in practice, the same number may be applied to two or more zones, when the nature of the colored picture is such that two or more zones have a common color. The line drawing, instead of carrying numbers in the zones to identify the colors to be applied thereto, may carry letters for this purpose, such as R for red, G for green and B for blue.

Thus if the facial region of the man and that of the woman are similarly colored in the original painting, the separate zones which define these regions will bear the same symbol identifying the color to be applied to these zones.

The crayons or markers in set 11 are identified by different number or letters so that the user of the kit, when he sees a number or letter in a zone to be colored in, selects for this purpose the crayon or marker carrying the same number or letter.

If a colored picture only has say eight different colors, then it would be a simple matter to dissect this picture into zones to be colored in by eight colors. But many colored pictures have a greater range of colors and a system in accordance with the invention must take this into account.

Color is the sensation produced in the eye of an observer by light waves of a particular wavelength. When natural light passes through a glass prism, it is separated into a visible spectrum of elementary colors: red, orange, yellow, green, blue, indigo and violet, the longest wavelength being red. Color is therefore a property of light that depends on its wavelength. Colors, whose beams of light are in various combinations can produce any one of the color sensations.

The additive primary colors are red-green and blue-violet, which in various combinations produce the full range of colors, this being the foundation of color TV and color photography.

The present invention does not seek to faithfully reproduce the full range of colors included in a color picture, but only to approximate these colors. Thus if the color in one region of the picture is red, and the color in another region is reddish brown, the zones in the line drawing may bear the same symbol.

Figure 4:
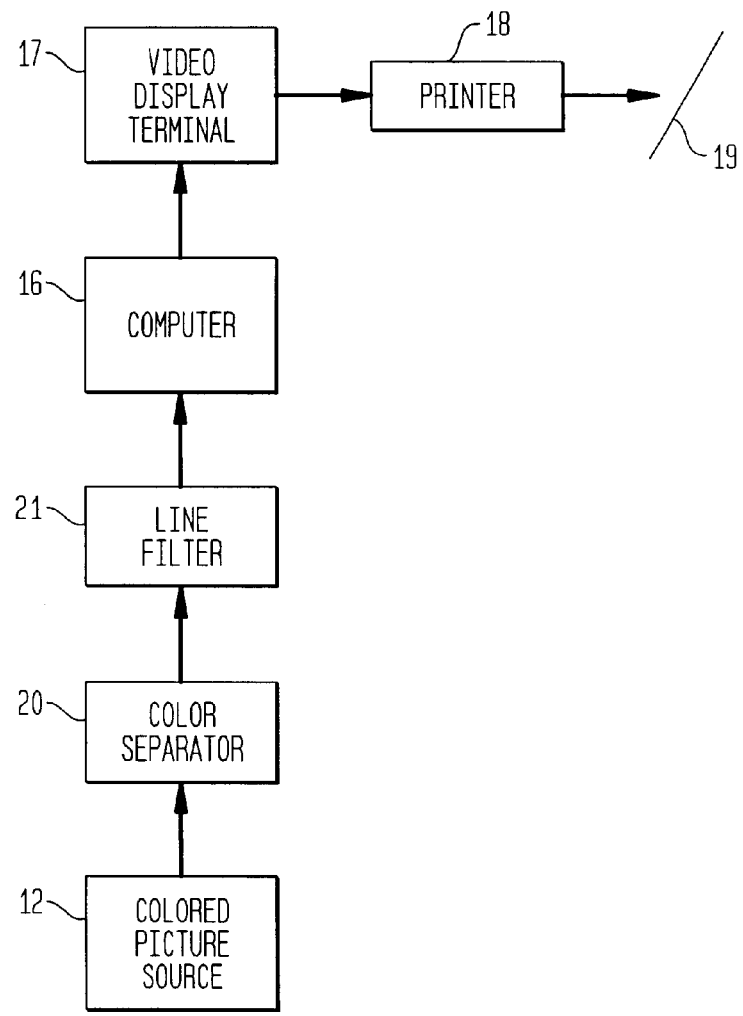
FIG. 4 is a block diagram of the computer system.

Referring now to FIG. 4, there is shown a computer system in accordance with the invention for converting a colored picture derived from software 12 included in the craft kit into a line drawing in which each of these regions is delineated to define a zone. The computer system is provided with a digital computer 16 having a video display terminal 17 to which is coupled a printer 18 for printing out on a sheet 19 a black and white image of the image appearing on the screen of the terminal.

Software 12 may take the form of a collection of different multi-colored paintings, images of which are digitally stored, such as in a CD-ROM. Hence the user of the system can select whichever picture from the software he wishes to reproduce.

The digital image of the colored picture yielded by software 12 is fed to a digital color separator 20. The separator acts to dissect the colored picture into elementary color regions. By elementary colors is meant the colors in the visible spectrum (red, orange, yellow, green, blue, indigo and violet) as well as colors similar thereto. Thus a color that is more orange than yellow will be treated by the color separator as orange. Hence separator 20 yields a series of color-dissected partial images, each partial image being composed of regions all having a similar color. Computer 16 which includes a bank of numbers or symbols acts to apply to each common color region of a dissected image the same symbol to identify the color thereof.

Each color-separated image from color separator 20 is fed into a line filter 21 created by line conversion software, such as software for this purpose available from Micrografx Pictures Publishers. This line conversion program delineates each region of the color separated image to define a zone.

In computer 16, the line drawings derived from the series of color-separated image are combined to create a completed line drawing, as shown in FIG. 3, of the original colored picture. Then the line drawing which appears on the screen of the video display terminal 17 is printed out by printer 18 on a line drawing sheet 19.

Thus a user of the system, having selected for conversion a colored picture from a colored picture source 12, now has a line drawing of this picture divided into color-in zones which he can color in by using the color crayons or markers included in the kit. While the colored-in line drawing is not a color accurate reproduction of the original colored picture, its colors approximate these in the original.

In practice, the user of the system selects from the software 12 whatever picture he wishes, which picture he can see in its authentic colors on the screen of terminal 17.

In making his selection, the user bypasses color separator 20 and line filter 21. After making this selection, the selected colored picture is then processed by the color separator and line filter to derive a color-in line drawing therefrom.

While there has been shown a preferred embodiment of a computer system for converting a colored picture into a color-in line drawing in accordance with the invention, it will be appreciated that many changes and modifications may be made therein without, however, departing from the essential spirit thereof.

I claim:

1. A computer system craft kit for children for converting a colored picture composed of color rigions distributed throughout the picture into a line drawing in which each of said regions is delinented to define a color-in zone, said system comprising:

A. a computer provided with a video display terminal to print out an a sheet an image displayed on the terminal;

B. a printer coupled to the display terminal;

C. means to feed into the computer a digital image of the colored picture to be converted;

D. software associated with the computer to process said digital image to produce said line drawing which is displayed on said terminal and printed on said sheet whereby a user of the sysem, by hand coloring in said zones, on said printed sheet, can recreate said colored picture, and E. a set of crayons or color markers for coloring in said zones.

2. A computer as set forth in claim 1 in which a collection of colored pictures is digitally stored in software, the user selecting for conversion one of said pictures.

3. A computer system as set forth in claim 1, further including means to identify each zone with a symbol that indicates the color to be applied thereto.

4. A computer as set forth in claim 1, in which the software to process the digital image includes a color separator to separate the color regions of which the picture is composed into partial images having a common color.

5. A computer as set forth in claim 4, in which the common color is an elementary color in the color spectrum or a color similar thereto.

6. A computer as set forth in claim 4, further including a line filter to delineate the separated color regions.

* * * * *